United States Patent
Mine et al.

(10) Patent No.: US 9,841,993 B2
(45) Date of Patent: Dec. 12, 2017

(54) REALTIME HYPERVISOR WITH PRIORITY INTERRUPT SUPPORT

(71) Applicant: Hitachi, Ltd., Tokyo (JP)

(72) Inventors: Hiroshi Mine, Tokyo (JP); Satoshi Oshima, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/108,436

(22) PCT Filed: Dec. 27, 2013

(86) PCT No.: PCT/JP2013/085033
§ 371 (c)(1),
(2) Date: Jun. 27, 2016

(87) PCT Pub. No.: WO2015/097839
PCT Pub. Date: Jul. 2, 2015

(65) Prior Publication Data
US 2016/0328261 A1 Nov. 10, 2016

(51) Int. Cl.
*G06F 9/48* (2006.01)
*G06F 9/455* (2006.01)

(52) U.S. Cl.
CPC ........ *G06F 9/4831* (2013.01); *G06F 9/45558* (2013.01); *G06F 9/4818* (2013.01); *G06F 9/4881* (2013.01); *G06F 2009/4557* (2013.01)

(58) Field of Classification Search
CPC .. G06F 9/4831; G06F 9/45558; G06F 9/4818; G06F 9/4881; G06F 2009/4557
See application file for complete search history.

(56) References Cited

U.S. PATENT DOCUMENTS 8,312,197 B2 * 11/2012 Schwarz ............. G06F 9/45533
710/267
8,706,941 B2 * 4/2014 Serebrin ............. G06F 9/45558
710/260

(Continued)

OTHER PUBLICATIONS

International Search Report of PCT/JP2013/085033 dated Feb. 10, 2014.

(Continued)

*Primary Examiner* — Benjamin Wu
(74) *Attorney, Agent, or Firm* — Mattingly & Malur, PC

(57) ABSTRACT

A problem with conventional art is that, in an environment wherein a plurality of interrupts having different priorities for processing occur in an overlapping manner from external devices, responding to high-priority interrupts while ensuring execution intervals of periodic tasks has been difficult. A partition execution control device according to the present invention comprises: a first management table which stores, for each partition, initial time slices, remaining time slices, execution priorities, execution states, and an interrupt disable level for suppressing the interrupts from the external devices; and a second management table which stores the interrupt priorities of the external devices and partitions to which the interrupts are to be output. This partition execution control device controls the execution of the partitions using the execution priorities and the time slices stored in the management tables, and controls the execution of the interrupts using the interrupt disable levels and the interrupt priorities.

7 Claims, 7 Drawing Sheets

(56) References Cited

U.S. PATENT DOCUMENTS

| | | | | |
|---|---|---|---|---|
| 2005/0229178 A1* | 10/2005 | Ballantyne | ............ | G06F 9/4887 |
| | | | | 718/100 |
| 2005/0251806 A1* | 11/2005 | Auslander | ........... | G06F 9/45533 |
| | | | | 718/100 |
| 2008/0046621 A1* | 2/2008 | Okino | ................... | G06F 9/4812 |
| | | | | 710/260 |
| 2008/0141277 A1* | 6/2008 | Traut | .................. | G06F 9/45533 |
| | | | | 719/313 |
| 2008/0172666 A1* | 7/2008 | Inoue | ................... | G06F 9/5077 |
| | | | | 718/1 |
| 2009/0210879 A1 | 8/2009 | Kaiser et al. | | |
| 2009/0328035 A1* | 12/2009 | Ganguly | ............... | G06F 9/4812 |
| | | | | 718/1 |
| 2011/0219374 A1* | 9/2011 | Mann | ................... | G06F 9/4418 |
| | | | | 718/1 |
| 2011/0320663 A1* | 12/2011 | Brice, Jr. | .............. | G06F 9/4812 |
| | | | | 710/269 |
| 2012/0198464 A1* | 8/2012 | Taira | ........................ | G05B 9/02 |
| | | | | 718/103 |
| 2013/0024589 A1* | 1/2013 | Yamauchi | ............ | G06F 9/4812 |
| | | | | 710/263 |
| 2013/0347000 A1* | 12/2013 | Inoue | ..................... | G06F 9/505 |
| | | | | 718/105 |
| 2014/0047150 A1* | 2/2014 | Marietta | ................. | G06F 13/14 |
| | | | | 710/264 |

OTHER PUBLICATIONS

Extended European Search Report received in corresponding European Application No. 13900228.1 dated Jul. 13, 2017.

* cited by examiner

300

PARTITION MANAGEMENT TABLE

| PARTITION NUMBER (301) | INITIAL TIME SLICE (302) | REMAINING TIME SLICE (303) | EXECUTION PRIORITY (304) | INTERRUPT DISABLE LEVEL (305) | STATUS (306) |
|---|---|---|---|---|---|
| 1 | 40 | 40 | 1 | 1 | Ready |
| 2 | 30 | 30 | 3 | 4 | Ready |
| 3 | 30 | 30 | 2 | 8 | Ready |

INTERRUPT MANAGEMENT TABLE

| DEVICE NUMBER (401) | INTERRUPT OUTPUT DESTINATION PARTITION NUMBER (402) | INTERRUPT PRIORITY (403) |
|---|---|---|
| 1 | 1 | 2 |
| 2 | 2 | 3 |
| 3 | 3 | 7 |

Fig.4

REALTIME HYPERVISOR WITH PRIORITY INTERRUPT SUPPORT

BACKGROUND OF THE INVENTION

This invention relates to a real-time hypervisor.

A virtualization technology for operating a plurality of OSes and a plurality of pieces of application software on one physical computer has been put to practical use. The virtualization technology allows each of physical resources provided to a computer to be virtualized and to be handled as a plurality of logical resources, the physical resources including a central processing unit (CPU), a memory, and input/output (I/O) devices such as a timer device, a general purpose input output (GPIO), a network interface card (NIC), and a host bus adapter (HBA). Through use of the virtualization technology, a plurality of virtual computers, namely, virtual machines, each including virtualized logical resources can be provided on one physical computer, and the OSes and the pieces of application software can be individually operated on those virtual machines.

A mechanism for dividing each of the physical resources of a computer into a plurality of logical resources through use of the virtualization technology is referred to as "logical partitioning (LPAR)", and a partition obtained by the division through the logical partitioning is referred to as "logical partition". Firmware or software for providing a virtual machine is referred to as "virtual machine monitor" or "hypervisor". The hypervisor realizes the logical partitioning of the physical resource through use of software emulation of hardware or a virtualization support mechanism provided to hardware, for example, an input/output memory management unit (IOMMU) or single root input/output virtualization (SR-IOV), and builds a virtual machine including virtualized logical resources within the logical partition. A task, for example, a process or a thread, which is an execution unit of an OS or application software, is executed within a virtual machine built by a hypervisor, that is, within a partition defined through the logical partitioning.

When the virtualization technology is applied to a microcontroller to be used mainly for controlling an apparatus, for example, an inverter or an engine, it is important to ensure the real-time property. The real-time property represents a property relating to actual time control for a system, for example, accuracy of an execution interval for a periodic task or latency of a response to the interrupt issued from an external device. In general, in the virtualization technology, the real-time property is adversely affected by overhead of software emulation or a hardware virtualization support mechanism.

As a technology applicable to the ensurance of the real-time property under a virtualized environment, in US 2009/0210879 A1, there is disclosed a system for distributing a calculation time to the logically divided partitions based on a priority of a process or a thread to be executed within each individual partition.

SUMMARY OF THE INVENTION

In the related art, the execution interval for a periodic task is controlled by distributing the calculation time based on the priority of the task. However, an interrupt priority is not taken into consideration for the control. This raises the problem in that, in an environment in which a plurality of interrupts to be processed, which have different priorities, are issued from the external device in a multiplexed manner, it is difficult to handle an interrupt with a high priority while ensuring the execution interval for a periodic task.

This invention has an object to provide a logical partitioning system for handling a priority interrupt without impairing a real-time property of a periodic task, which solves the above-mentioned problem, and a hypervisor having such a logical partitioning function.

In order to solve the above-mentioned problem, a hypervisor according to one embodiment of this invention includes: a first management table configured to store, for each partition, an initial task executable time, a remaining task executable time, an execution priority, an execution status, and an interrupt disable level for suppressing an interrupt to be issued from an external device; and a second management table configured to store an interrupt priority of the external device and an interrupt output destination partition.

The hypervisor according to one embodiment of this invention refers to the first management table to execute partitions with the remaining task executable time being available and the execution status being an executable status in order of the execution priority. In a case where an interrupt has been issued from the external device, the hypervisor according to one embodiment of this invention refers to the first management table and the second management table to interrupt the processing of the partition in execution and execute the interrupt output destination partition when the interrupt disable level of the partition in execution is exceeded and when the remaining task executable time of the interrupt output destination partition is available. When the interrupt disable level of the partition in execution is not exceeded or when the remaining task executable time of the interrupt output destination partition is not available, the hypervisor leaves the interrupt pending, and continues the processing of the partition in execution. The interrupt left pending is processed when the row of the interrupt output destination partition is next scheduled by a scheduler of the hypervisor.

When an execution time corresponding to a sum of the initial task executable times of the respective partitions stored in the first management table has elapsed, the hypervisor according to one embodiment of this invention resets each remaining task executable time to the initial task executable time.

According to this invention, it is possible to provide a partition execution processing apparatus configured to execute an interrupt processing task based on the priority of the interrupt without impairing the real-time property of the periodic task, and a method therefor.

BRIEF DESCRIPTION OF THE DRAWINGS

The present invention can be appreciated by the description which follows in conjunction with the following figures, wherein:

FIG. 3 is an illustration of detail of a partition management table according to the first embodiment of this invention, FIG. 4 is an illustration of detail of an interrupt management table according to the first embodiment of this invention.

DETAILED DESCRIPTION OF THE PREFERRED EMBODIMENTS

Figure 1:
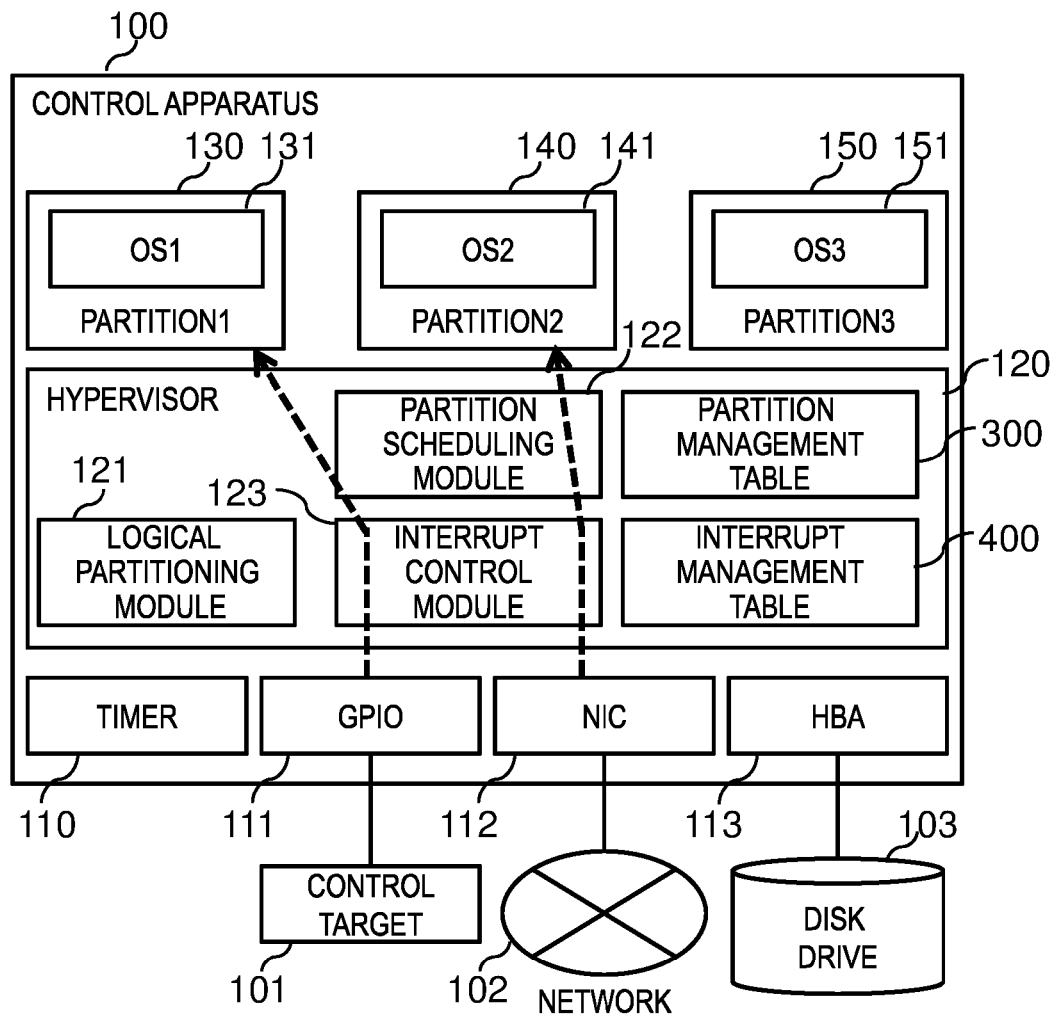
FIG. 1 is an illustration of an outline of a control system according to a first embodiment of this invention.

Referring to the accompanying drawings, an embodiment of the present invention is described below. In the drawings, like elements are denoted by the same reference symbols and a description thereof is omitted.

First Embodiment

FIG. 1 is an illustration of an outline of a control system according to a first embodiment of this invention. In the control system according to this embodiment, a control apparatus (100) is configured to control a control target (101), for example, an inverter or an actuator. The control apparatus (100) is further coupled to a network (102) and a disk drive (103). The network (102) is, for example, a local area network (LAN) or a wide area network (WAN), and may be wired or wireless. The control apparatus (100) is further configured to communicate to/from an external display apparatus and an external operation device through the network (102). The disk drive (103) may be, for example, external redundant arrays of inexpensive disks (RAID), an external small computer system interface (SCSI) disk, a built-in flash memory, or solid state disk (SSD). The control apparatus (100) is further configured to read and write control information and a measurement value from/to the disk drive (103).

The control apparatus (100) includes devices each configured to generate an interrupt, such as a timer (110), a GPIO (111), a NIC (112), and an HBA (113). The control target (101) are coupled to the control apparatus (100) through the GPIO (111), the network (102) are coupled to the control apparatus (100) through the NIC (112), and the disk drive (103) are coupled to the control apparatus (100) through the HBA (113), respectively.

The control apparatus (100) includes a hypervisor (120) for realizing a logical partitioning function according to this invention. The hypervisor (120) includes, as functional modules, a logical partitioning module (121), a partition scheduling module (122), and an interrupt control module (123). The hypervisor (120) further includes, as management information, a partition management table (300) and an interrupt management table (400). The logical partitioning module (121) is configured to logically divide a physical resource provided to the control apparatus (100) to provide logical partitions. The partition scheduling module (122) is configured to distribute an execution time to each logical partition through use of the information stored in the partition management table (300). The interrupt control module (123) is configured to output an interrupt issued from a device to each of the logical partitions through use of the information stored in the interrupt management table (400).

Herein, the "output of the interrupt" means to supply a trigger to perform processing for handling the cause of an interrupt to software executed within a target logical partition through an input of a virtual interrupt signal to the logical partition.

The hypervisor (120) is configured to build a partition 1 (130), a partition 2 (140), and a partition 3 (151), which serve as the logical partitions, on the control apparatus (100) through use of the functional modules and the management information described above, to distribute the execution time to each of the partitions, and to output the interrupt issued from the device. An OS 1 (131), an OS 2 (141), and an OS 3 (151) individually operate within the partition 1 (130), the partition 2 (140), and the partition 3 (151), respectively. The number of partitions provided by the hypervisor (120) may be one, or may be two or more as long as the physical resource permits. Further, the software executed within the partition may be a general-purpose OS, may be a real time operating system (RTOS) being an OS specialized in real-time control, or may be only real-time control application software excluding an OS function, that is, may be OS-less.

This embodiment is described by taking an example of three partitions and OSes executed in the respective partitions, but more partitions and more OSes may be executed depending on hardware capabilities.

For example, in a case where an RTOS is executed as the OS 1 (131) and a general-purpose OS is executed as the OS 2 (141), the hypervisor (120) respectively outputs an interrupt issued from the GPIO (111) coupled to the control target (101) to the partition 1 (130) and an interrupt issued from the NIC (112) coupled to the network (102) to the partition 2 (140), to thereby be able to respectively cause the OS 1 (131) being the RTOS to process control of the control target (101) and cause the OS 2 (141) being the general-purpose OS to process communications through the network (102).

Further, for example, in a case where the OS 1 (131) executes a periodic task, the hypervisor (120) periodically supplies the execution time to the partition 1 (130), to thereby be able to create an opportunity for the OS 1 (131) to periodically execute the periodic task. In a case where a plurality of tasks exist within the OS 1 (131), the OS 1 (131) may schedule an execution order of the tasks based on the priorities and the like of the respective tasks. Herein, the "task" represents a unit of processing of software, for example, a process or a thread, and may be an interrupt handler processing or polling processing.

A program to be executed in the above-mentioned control system may be provided by being recorded on a computer-readable recording medium, for example, a flexible disk (FD), a CD, or a DVD, in a file of an installable or executable format. Further, the program to be executed on the control apparatus may be provided or distributed by being stored on a computer coupled to a network, for example, the Internet, and downloaded via the network, or may be provided by being packaged in advance in a ROM or the like.

Figure 2:
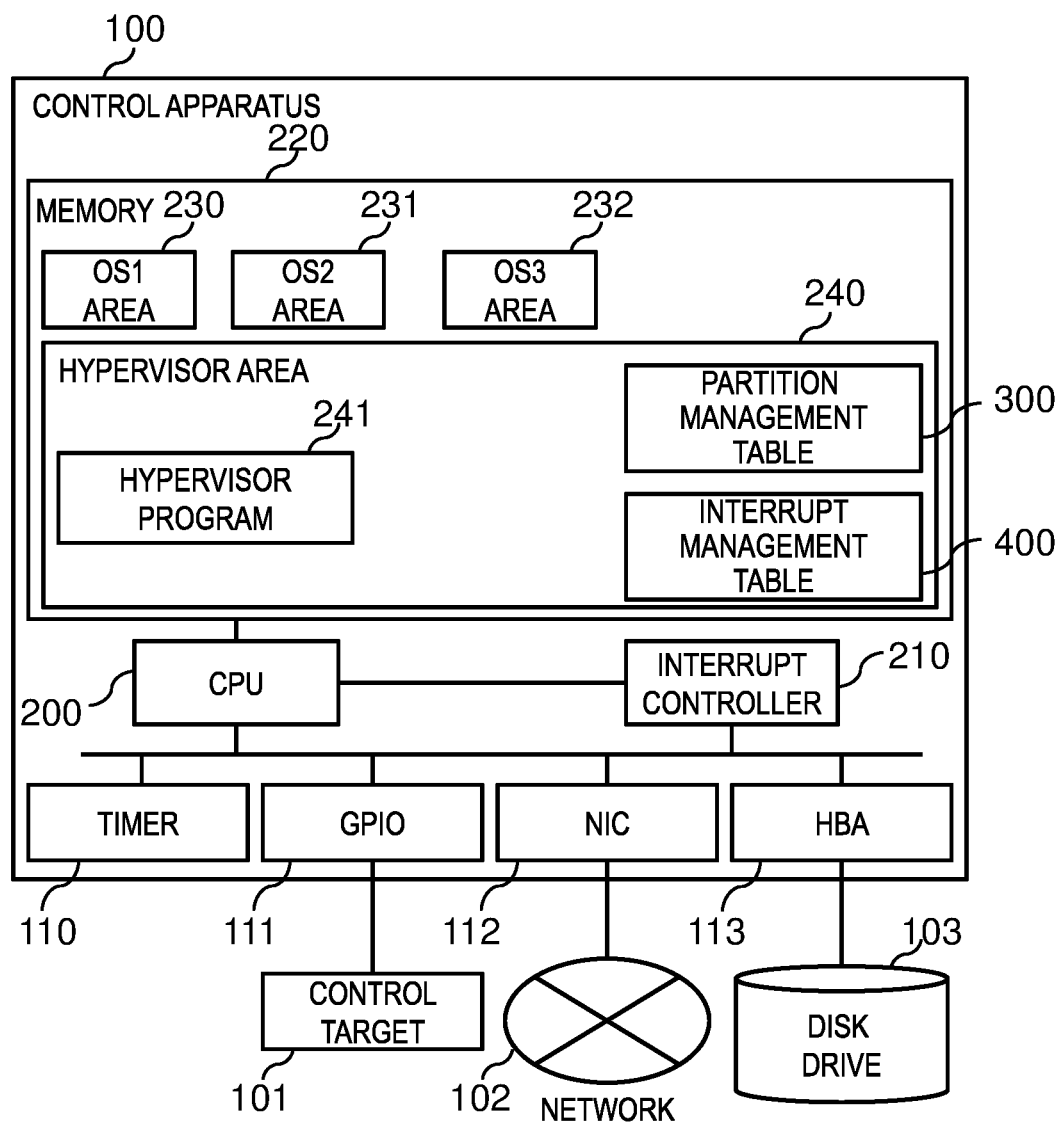
FIG. 2 is an illustration of an example of a hardware configuration of a control apparatus according to the first embodiment of this embodiment.

FIG. 2 is an illustration of an example of a hardware configuration of the control apparatus (100) according to this embodiment. The control apparatus (100) includes a CPU (200), an interrupt controller (210), and a memory (220). Illustrations and descriptions of a display apparatus, a power supply apparatus, and the like are omitted.

The CPU (200) is configured to execute a program code stored on the memory (220), to thereby control an entirety of the control apparatus (100) including the interrupt controller (210) and the devices such as the timer (110), the GPIO (111), the NIC (112), and the HBA (113). As the CPU (200), a plurality of CPUs may exist on the control apparatus (100), and a single core processor or a multi-core processor may be employed. Further, the CPU (200) may read a program file stored on the disk drive (103) onto the memory (220) to execute the program file, or may download the program file from a file server apparatus or the like coupled through the network (102) onto the memory (220) to execute the program file.

The interrupt controller (210) is, for example, an advanced programmable interrupt controller (APIC) or a nested vectored interrupt controller (NVIC), and is configured to control the output of an interrupt from each of the timer (110), the GPIO (111), the NIC (112), and the HBA (113) to the CPU (200).

The memory (220) is a main storage apparatus of the control apparatus (100), and is formed of, for example, a dynamic random access memory (DRAM) or a static random access memory (SRAM). The memory (220) stores an OS 1 area (230), an OS 2 area (231), an OS 3 area (232), a hypervisor area (240), and the like. The OS 1 area (230) stores a program code of the OS 1 (131) to be executed within the partition 1 (130) and data to be used by the program code and a code of an application program to be executed on the OS 1 (131) and data to be used by the code. The same applies to the OS 2 area (231) and the OS 3 area (232).

The hypervisor area (240) stores a hypervisor program (241), the partition management table (300), and the interrupt management table (400). The CPU (200) executes the hypervisor program (241), to thereby realize the function of each of the functional modules such as the logical partitioning module (121), the partition scheduling module (122), and the interrupt control module (123) within the hypervisor (120), that is, the logical partitioning function according to this invention. A part or all of the functions of the hypervisor program (241) may be implemented on the control apparatus (100) through use of hardware, a field programmable gate array (FPGA), or the like. Further, the functions of the hypervisor (120) may be implemented as firmware of the control apparatus (100), or may be implemented as drivers and functional modules of a host OS operating on the control apparatus (100). In a case where a part or all of the functions of the hypervisor program (241) are implemented as firmware, it is possible to reduce the size of the hypervisor area (240) occupied on the memory (220) by locating the hypervisor program (241) on a read only memory (ROM). When the functions of the hypervisor (120) are implemented as drivers and functional modules of a host OS, the values of the partition management table (300) and the interrupt management table (400) can be easily set through use of functions such as a graphical user interface (GUI) provided by the OS and a Web service.

The "execution of a partition by the hypervisor (120)" means to execute the software within the logical partition by the CPU (200). For example, "to execute the partition 1 (130)" means to control the CPU (200) to execute the program code stored in the OS 1 area (230) on the memory (220) corresponding to the software of the OS 1 (131) within the partition 1 (130).

FIG. 3 is an illustration of detail of the partition management table (300). For each of the partitions including the partition 1 (130) provided by the logical partitioning module (121) of the hypervisor (120), the partition management table (300) stores a partition number (301), an initial time slice (302), a remaining time slice (303), an execution priority (304), an interrupt disable level (305), and a status (306). The partition scheduling module (122) performs scheduling, that is, selection of a partition to be executed next, through use of those pieces of information within the partition management table (300).

The "time slice" represents a computer time usable to the partition, which includes a task executable time.

The partition number (301) indicates a number for uniquely identifying each partition. Each functional module of the hypervisor (120) uses the partition number (301) to manage the partition to be processed.

The initial time slice (302) indicates a time slice, namely, an execution time, distributed to each partition every schedule period. The time slice is, for example, a time expressed in units of microseconds or a clock tick count expressed in units of timer interrupt intervals. In this case, a total sum value of the initial time slices (302) corresponds to one schedule period. Further, the initial time slice (302) may be set as, for example, a distribution proportion defined with reference to the schedule period by assuming one schedule period as one second. In this case, the execution time per unit time slice changes depending on the total sum value of the initial time slices (302).

The remaining time slice (303) indicates a time slice remaining for each partition in a given schedule period. In a case where the value of the time slice is the clock tick count, the value of the remaining time slice (303) of the partition in execution is decremented by the partition scheduling module (122) each time a timer interrupt occurs. The partition having the value of zero as the remaining time slice (303) is no longer executed during the schedule period. In a case where the execution time corresponding to the total sum of the initial time slices (302) of the respective partitions has elapsed, that is, in a case where one schedule period has been completed, the value of the remaining time slice (303) of each partition is reset to the value of the initial time slice (302) by the partition scheduling module (122).

The execution priority (304) indicates the priority used when each partition is executed. The value of the execution priority (304) is, for example, an integer value with "1" being set as the highest priority, and when duplication of the value is permitted, a higher priority may be given to the smaller partition number (301).

The interrupt disable level (305) indicates a level of an interrupt to be disabled during the execution of each partition. The value of the interrupt disable level (305) is, for example, an integer value with "1" being set as the highest level. Even when the interrupt with a priority that does not exceed the priority indicated by the interrupt disable level occurs during the execution of the partition, the interrupt is left pending without being processed.

The status (306) indicates an execution status of each partition. The status (306) is changed based on the execution status of each partition by the hypervisor (120). The execution status of the partition includes, for example, "in execution" (Running), "ready for execution" (Ready), and "waiting for an event" (Wait). The status (306) of the partition currently in execution is set to "in execution". In a case where a plurality of CPUs (200) exist on the control apparatus (100) or in a case where the multi-core processor is employed, a plurality of partitions in execution may exist at the same time. The status (306) of the partition whose processing can be started immediately when an execution opportunity is given is set to "ready for execution". The status (306) of the partition whose processing cannot be started because events such as an interrupt and a lapse of time are waited for even when an execution opportunity is given is set to "waiting for an event". For example, in a case where the value of the remaining time slice (303) becomes zero, the partition in execution has the status (306) changed to "ready for execution" after having the processing interrupted. In a case where, for example, the remaining time slice (303) is not zero but a sleep mode is effected for a given period in order to follow a control period of the control target (101), the partition in execution has the status (306) changed to "waiting for an event".

The respective values of the initial time slice (302), the execution priority (304), and the interrupt disable level (305) of the partition management table (300) may be manually set by a system administrator who manages the control apparatus (100) in order to meet the purpose of the control system, or may be set semiautomatically or automatically through use of a setting support tool or the like.

FIG. 4 is an illustration of detail of the interrupt management table (400) according to this embodiment. For each of the devices, for example, the timer (110), provided to the control apparatus (100) and configured to generate an interrupt, the interrupt management table (400) stores a device number (401), an interrupt output destination partition number (402), and an interrupt priority (403). The interrupt control module (123) uses those pieces of information within the interrupt management table (400) to determine an interrupt output destination partition. The device managed by the interrupt management table (400) is not limited to a physical device, and may be a device logically divided by the logical partitioning module (121), in another case, virtualized by SR-IOV or software emulation.

The device number (401) indicates a number for uniquely identifying each device. Each of the modules of the hypervisor (120) uses the device number (401) to manage the device to be processed.

The interrupt output destination partition number (402) indicates a partition to which an interrupt is to be output in a case where the interrupt is issued, that is, a number assigned to the partition in which the interrupt is to be processed. In a case where, for example, the device can be shared among partitions, a plurality of partitions may be specified as interrupt output destinations.

The interrupt priority (403) indicates the priority of an interruption to be generated by each device. The value of the interrupt priority (403) is, for example, an integer value with "1" being set as the highest priority, and duplication of the value is permitted. In a case where the interrupt priority (403) of the interrupt that has occurred is higher than the interrupt disable level (305) of the partition currently in execution, and in a case where the value of the remaining time slice (303) of the partition specified in the interrupt output destination partition number (402) is not zero, the processing of the partition currently in execution is interrupted, and the partition specified in the interrupt output destination partition number (402) is executed. Otherwise, the interrupt that has occurred is left pending without being processed.

In the same manner as in the case of the partition management table (300), the respective values of the interrupt output destination partition number (402) and the interrupt priority (403) of the interrupt management table (400) may be manually set by the system administrator, or may be set semiautomatically or automatically through the use of the setting support tool or the like.

This embodiment is described by taking an example of a system configured to receive interrupts from three devices, but can be applied to a system configured to receive more interrupts.

Now, processing of each functional module of the hypervisor (120) according to this embodiment is described with reference to a flowchart.

Figure 5:
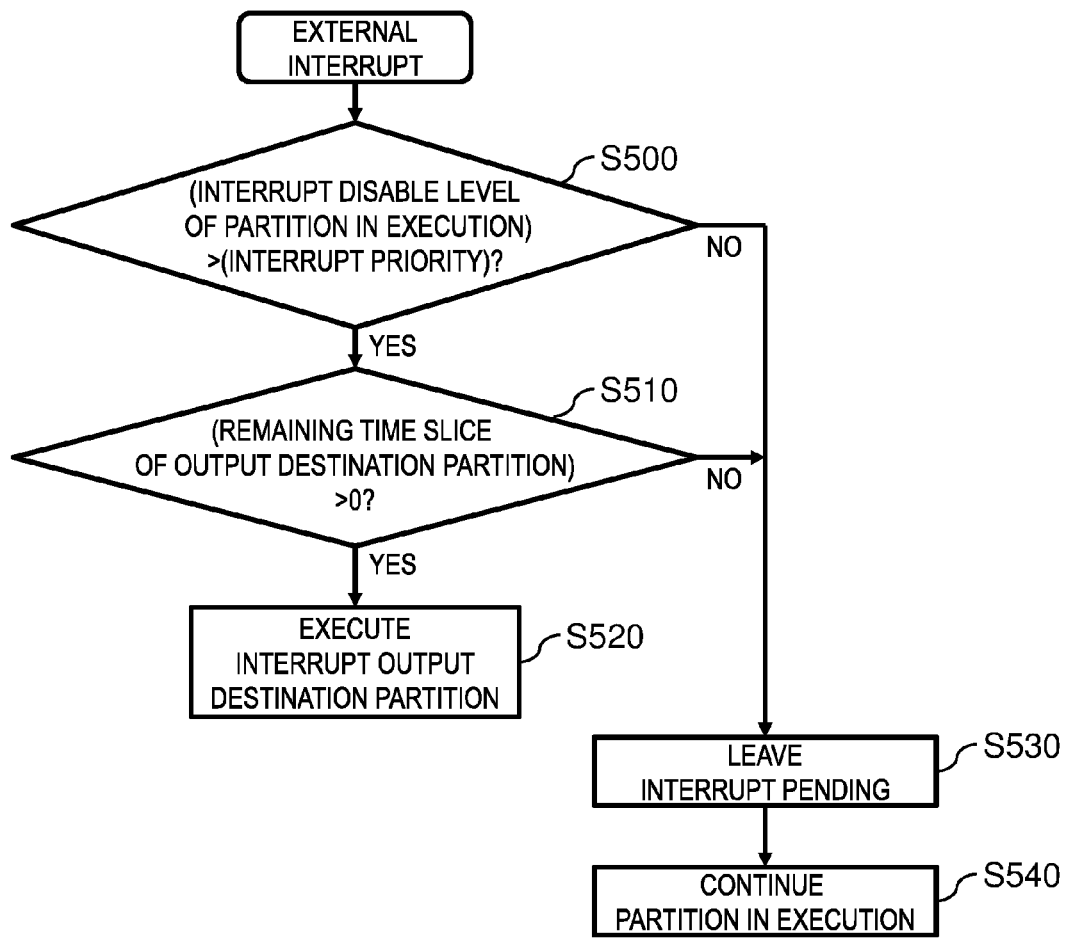
FIG. 5 is a flowchart for illustrating processing of an interrupt control module configured to handle an external interrupt issued from a device according to the first embodiment of this invention.

FIG. 5 is a flowchart for illustrating the processing of the interrupt control module (123) configured to handle an external interrupt issued from the device according to this embodiment. The interrupt control module (123) outputs external interrupts generated by, for example, the GPIO (111), the NIC (112), and the HBA (113) to the partitions including the partition 1 (130) through use of the information stored in the interrupt management table (400).

In a case where an external interrupt occurs, the interrupt control module (123) refers to the partition management table (300) and the interrupt management table (400) to compare the interrupt disable level (305) of the partition being currently in execution, that is, having the status (306) of "in execution", and the interrupt priority (403) of the device that has generated the interrupt (S500).

In a case where the interrupt disable level (305) of the partition in execution is larger than the interrupt priority (403) of the device (YES in Step S500), the interrupt control module (123) refers to the interrupt management table (400) to obtain the value of the interrupt output destination partition number (402), and refers to the partition management table (300) to determine whether or not the remaining time slice (303) of the partition corresponding to the obtained interrupt output destination partition number (402) is larger than zero (S510).

In a case where the remaining time slice (303) of the interrupt output destination partition is larger than zero, that is, in a case where the time slice allocated to a scheduling period remains (YES in Step S510), the processing of the partition currently in execution is interrupted with the status (306) being set to "ready for execution", and the processing of the interrupt output destination partition is executed with the status (306) being set to "in execution" (S520).

In a case where the value of the interrupt disable level (305) of the partition in execution is equal to or smaller than the value of the interrupt priority (403) of the device (NO in Step S500), or in a case where the remaining time slice (303) of the interrupt output destination partition is zero (NO in Step S510), the interrupt that has occurred is left pending (S530), and the processing of the partition currently in execution is continued (S540).

With the above-mentioned processing, when there occurs an interrupt with a higher priority that requires the processing of a different partition while the processing of a partition for handling an interrupt with a lower priority is in execution, the hypervisor (120) according to this embodiment can interrupt the processing of the partition in execution, and can first execute the processing of the partition for handling the interrupt with the higher priority. Accordingly, it is possible to reduce latency of a response to the interrupt with a high priority.

Figure 6:
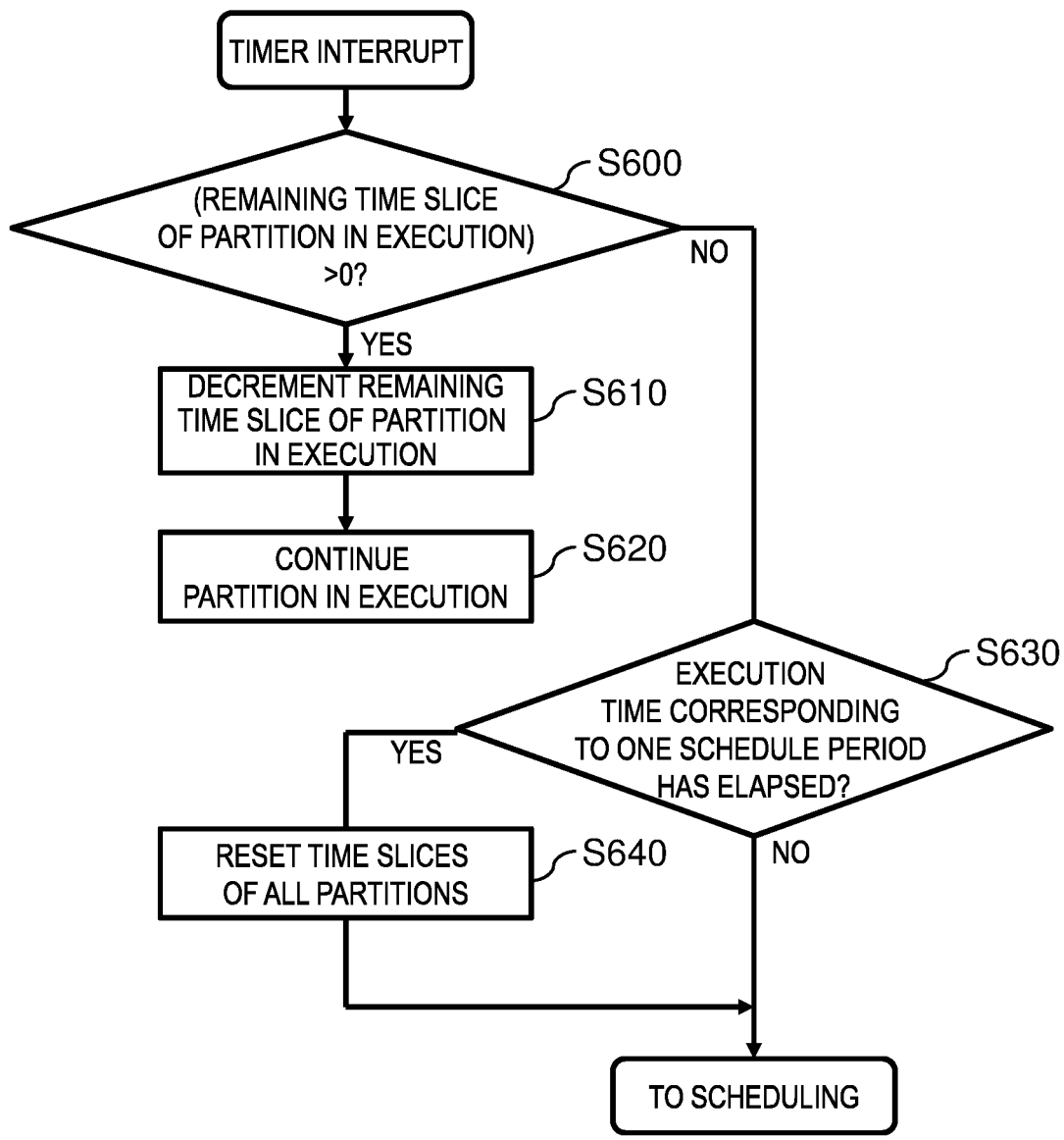
FIG. 6 is a flowchart for illustrating processing of a partition scheduling module configured to handle a timer interrupt according to the first embodiment of this invention.

FIG. 6 is a flowchart for illustrating the processing of the partition scheduling module (122) configured to handle a timer interrupt according to this embodiment. For example, with the timer interrupt periodically generated by the timer (110) being used as a trigger, the partition scheduling module (122) performs the scheduling of the partition to be executed next through the use of the information stored in the partition management table (300).

When the timer interrupt occurs, the partition scheduling module (122) refers to the partition management table (300) to determine whether or not the value of the remaining time slice (303) of the partition currently in execution is larger than zero (S600).

In a case where the value of the remaining time slice (303) of the partition in execution is larger than zero (YES in Step S600), the value of the remaining time slice (303) of the partition in execution is decremented, for example, in the case of the clock tick count, the value is decremented by one (S610). And the processing of the partition in execution is continued (S620).

In a case where the value of the remaining time slice (303) of the partition in execution is zero (NO in Step S600), the partition scheduling module (122) determines whether or not the execution time corresponding to one schedule period has elapsed (S630).

In a case where the execution time corresponding to one schedule period has not elapsed (NO in Step S630), the procedure directly advances to scheduling processing.

In a case where the processing of one scheduling period has been completed (YES in Step S630), the values of the remaining time slices (303) of all the partitions are reset to the values of the initial time slices (302) (S640), and the procedure advances to the scheduling processing.

Figure 7:
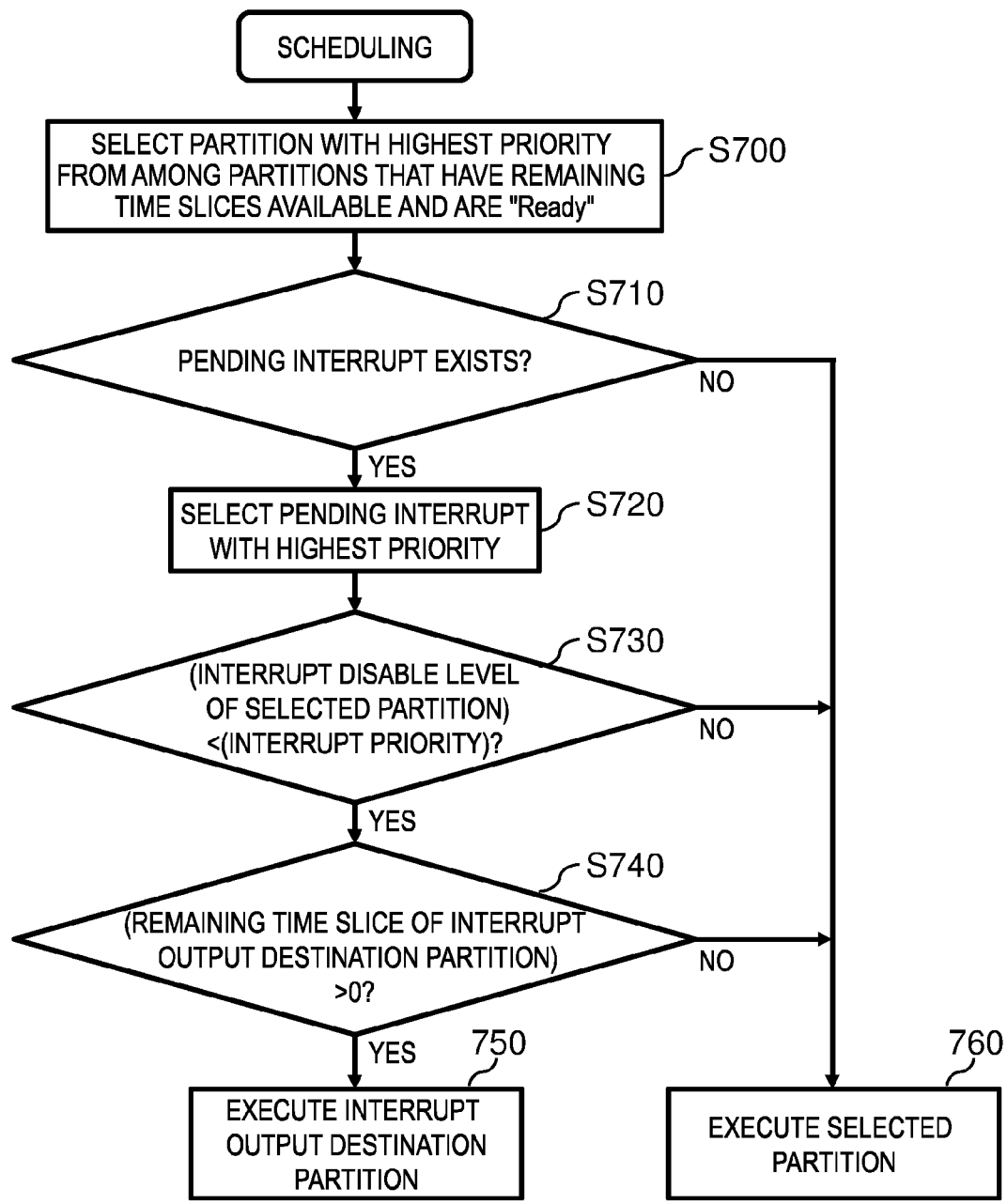
FIG. 7 is a flowchart for illustrating scheduling processing of the partition scheduling module according to the first embodiment of this invention.

FIG. 7 is a flowchart for illustrating the scheduling processing of the partition scheduling module (122) according to this embodiment. The partition scheduling module (122) executes the scheduling processing with the above-mentioned timer interrupt, or a shift to the "waiting for an event" status of the partition in execution, being used as a trigger.

The partition scheduling module (122) first refers to the partition management table (300) to select a partition with the highest priority, that is, a partition having the smallest value of the execution priority (304) from among the partitions having the value of the remaining time slice (303) larger than zero and having the status (306) of "ready for execution" (S700). Subsequently, the partition scheduling module (122) determines whether or not a pending interrupt exists (S710).

In a case where a pending interrupt exists (YES in Step S710), the partition scheduling module (122) refers to the interrupt management table (400) to select an interrupt with the highest priority, that is, an interrupt having the smallest value of the interrupt priority (403) from among the pending interrupts (S720). Subsequently, the partition scheduling module (122) compares the interrupt disable level (305) of the selected partition and the interrupt priority (403) of the selected interrupt (S730).

In a case where the interrupt disable level (305) is higher than the interrupt priority (403) (YES in Step S730), the partition scheduling module (122) refers to the partition management table (300) to determine whether or not the value of the remaining time slice (303) of the partition corresponding to the interrupt output destination partition number (402) of the selected interrupt is larger than zero (S740).

In a case where the remaining time slice (303) of the interrupt output destination partition is larger than zero, that is, in a case where the time slice remains (YES in Step S740), the processing of the interrupt output destination partition is executed (S750).

In a case where a pending interrupt does not exist (NO in Step S710), the processing of the first selected partition is continued when the interrupt disable level (305) of the selected partition is lower than the interrupt priority (403) of the selected interrupt (NO in Step S730), or when the remaining time slice (303) of the interrupt output destination partition is zero (NO in Step S740) (S760).

With the above-mentioned processing, the hypervisor (120) according to this invention can control an execution interval of the partition through use of the execution priority and the time slice of the partition, and can execute the processing of the pending interrupt based on the interrupt disable level of the partition and the priority of the interrupt.

Figure 8:
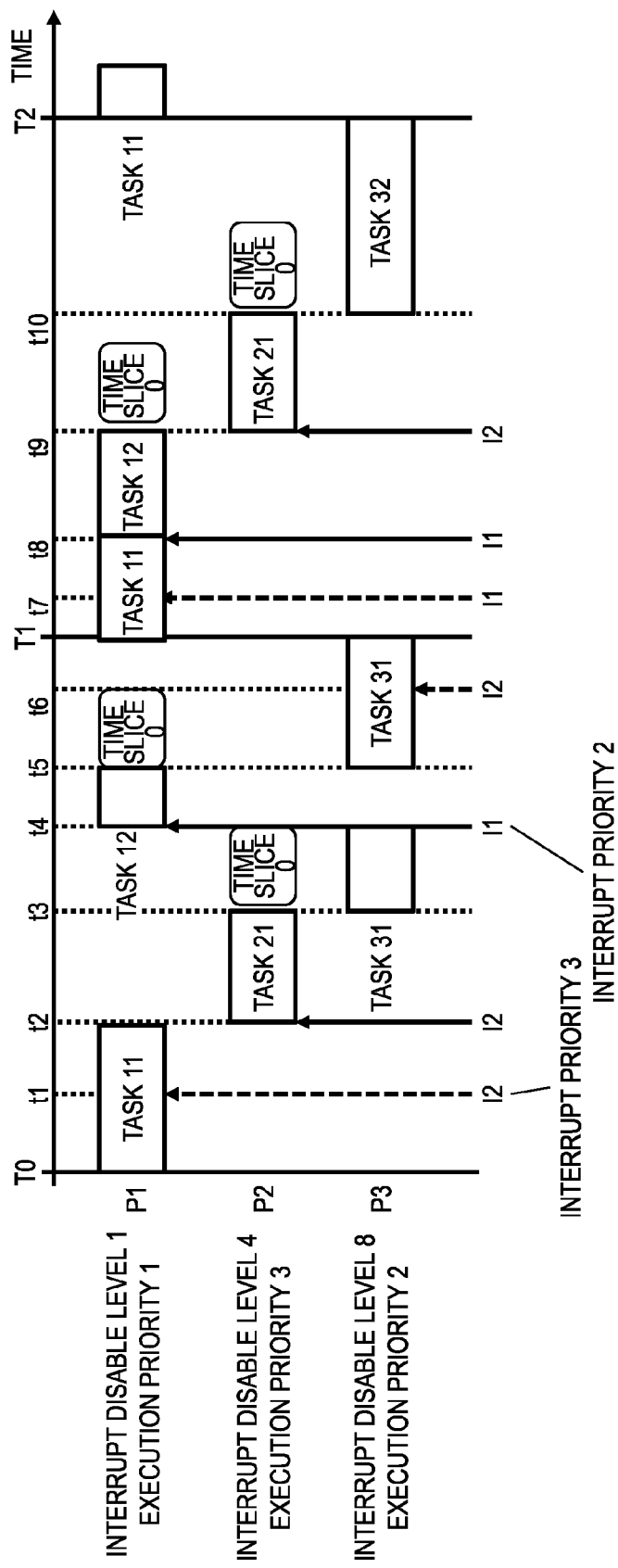
FIG. 8 is an illustration of an example in which a partition is executed by a hypervisor according to the first embodiment of this invention.

FIG. 8 is an illustration of an example in which the partition is executed by the hypervisor (120) according to this embodiment. T0 represents a start time, T1 represents a time indicating the end of one schedule period, and T2 represents a time indicating the end of another schedule period. P1, P2 and P3 correspond to the partition 1 (130), the partition 2 (140), and the partition 3 (150), respectively, and a period during which each partition is executed is indicated by a rectangular area.

I1 represents an interrupt issued from the GPIO (111) having the device number (401) of "1" which is coupled to the interrupt control target (101), and I2 represents an interrupt issued from the NIC (112) having the device number (401) of "2" which is coupled to the network (102). As arrows of those interrupts, the broken line indicates a pending interrupt, and the solid line indicates an actually output interrupt. The illustration of the timer interrupt issued from the timer (110) and a description of processing (S610) for decrementing the value of the remaining time slice (303), which is performed when the value of the remaining time slice (303) of the partition in execution obtained during timer interrupt processing illustrated in FIG. 6 performed by the hypervisor (120) in response to the timer interrupt is larger than zero (YES in Step S600), are omitted.

It is assumed that, at the time T0, no pending interrupt exists and the respective partitions and the respective interrupts are set as shown in the partition management table (300) and the interrupt management table (400), respectively.

First, the execution of the partition 1 (130) is started by the scheduling processing of the hypervisor (120) illustrated in FIG. 7. In this case, it is assumed that a task TASK 11 executed on the OS 1 (131) within the partition 1 (130) is a periodic task.

Subsequently, it is assumed that the interrupt I2 occurs at the time t1. At this time, in external interrupt processing of the hypervisor (120) illustrated in FIG. 5, the interrupt disable level (305) of "1" of the partition 1 (130) in execution is higher than the interrupt priority (403) of "3" of the interrupt I2 (NO in Step S500). Therefore, the interrupt I2 is left pending (S530), and the processing of the periodic task TASK 11 within the partition 1 (130) in execution is continued (S540).

Subsequently, it is assumed that, at the time t2, the periodic task TASK 11 executed on the OS 1 (131) is finished and the partition 1 (130) shifts the status (306) to the "waiting for an event" status with the remaining time slice (303) being available. At this time, the scheduling processing of the hypervisor (120) illustrated in FIG. 7 is executed, and the partition 3 (150) with the highest execution priority (304) is selected from among the partitions that have the remaining time slice (303) available and have the status (306) of "ready for execution" (S700).

Subsequently, I2 is a pending interrupt (YES in Step S710), and hence I2 is selected as the pending interrupt with the highest interrupt priority (403) (S720). The interrupt disable level (305) of "8" of the selected partition 3 (150) is lower than the interrupt priority (403) of "3" of I2 (YES in Step S730), and the remaining time slice of the interrupt output destination partition 2 (140) indicated by the interrupt output destination partition number (402) is larger than zero (YES in Step S740). Therefore, the partition 2 (140) being an interrupt output destination is executed (S750), and TASK 21 being an interrupt handler task for the interrupt I2 is executed.

Subsequently, it is assumed that, at the time t3, the timer interrupt occurs and the timer interrupt processing of the hypervisor (120) illustrated in FIG. 6 is executed. At this time, assuming that the remaining time slice (303) of the partition 2 (140) in execution is zero (NO in Step S600), the execution time corresponding to one scheduling period has not elapsed (NO in Step S630), and the scheduling processing of the hypervisor (120) illustrated in FIG. 7 is executed without another step. In this case, the partition 3 (150) having the remaining time slice (303) available and having the status (306) of an executable status is selected (S700), and no pending interrupt exists (NO in Step S710). Therefore, the selected partition 3 (150) is executed (S760), and TASK 31 is executed.

Subsequently, it is assumed that the interrupt I1 occurs at the time t4. At this time, in the external interrupt processing of the hypervisor (120) illustrated in FIG. 5, the interrupt disable level (305) of "8" of the partition 3 (150) in execution is lower than the interrupt priority (403) of "2" of the interrupt I1 (YES in Step S500), and the remaining time slice (303) of the partition 1 (130) being an interrupt output destination is available (YES in Step S510). Therefore, the partition 1 (130) being the interrupt output destination is executed (S520), and the interrupt I1 is processed by TASK 12 being an interrupt handler task.

Subsequently, it is assumed that, at the time t5, the timer interrupt occurs and the timer interrupt processing of the hypervisor (120) illustrated in FIG. 6 is executed. At this time, it is assumed that the interrupt handler task executed on the OS 1 (131) is finished, and the remaining time slice (303) is zero with the status (306) being the "ready for execution" status. In this case, in the scheduling processing illustrated in FIG. 7 that follows the timer interrupt processing of the hypervisor (120) illustrated in FIG. 6, the partition 3 (150) with the remaining time slice (303) being available is executed, and the processing of TASK 31 that has been interrupted is restarted.

Subsequently, it is assumed that, at the time t6, the interrupt I2 occurs and the external interrupt processing of the hypervisor (120) illustrated in FIG. 5 is executed. At this time, the interrupt disable level (305) of "8" of the partition 3 (150) in execution is lower than the interrupt priority of "3" of I2 (YES in Step S500), but the remaining time slice (303) of the partition 2 (140) being the interrupt output destination is zero (NO in Step S510). Therefore, the interrupt I2 is left pending (S530), and the processing of TASK 31 within the partition 3 (150) in execution is continued (S540).

Subsequently, it is assumed that, at the time T1, that is, after one scheduling period has elapsed, the timer interrupt occurs and the timer interrupt processing of the hypervisor (120) illustrated in FIG. 6 is executed. At this time, the execution time corresponding to one scheduling period has elapsed (YES in Step S630), and hence the values of the remaining time slices (303) of all the partitions are reset to the values of the initial time slices (302) (S640). In the following scheduling processing illustrated in FIG. 7, the partition 1 (130) is selected (S700), and because the interrupt disable level (305) of "2" is higher than the interrupt priority (403) of "3" of the pending interrupt I2 (NO in Step S730), the partition 1 (130) is executed (S760). In this case, it is also assumed that the task executed on the OS 1 (131) within the partition 1 (130) is the periodic task TASK 11.

Subsequently, it is assumed that, at the time t7, the interrupt I1 occurs and the external interrupt processing of the hypervisor (120) illustrated in FIG. 5 is executed. At this time, the interrupt disable level (305) of "1" of the partition 1 (130) in execution is higher than the interrupt priority (403) of "2" of the interrupt I1. Therefore, the interrupt I1 is left pending (S530), and the processing of the partition 1 (130) in execution is continued (S540), that is, the processing of the periodic task TASK 11 executed on the OS 1 (131) is continued.

Subsequently, it is assumed that, at the time t8, the periodic task TASK 11 of the OS 1 (131) is finished, and the partition 1 (130) shifts the status (306) to the "waiting for an event" status with the remaining time slice (303) being available. At this time, the scheduling processing of the hypervisor (120) illustrated in FIG. 7 is executed, and the partition 3 (150) with the highest execution priority (304) is selected from among the partitions that have the remaining time slice (303) larger than zero and have the status (306) of "ready for execution" (S700). However, I1 and I2 are pending interrupts (YES in Step S710), and hence I1 is selected as the pending interrupt with the highest interrupt priority 403 (403) (S720). The interrupt disable level (305) of "8" of the selected partition 3 (150) is lower than the interrupt priority (403) of "2" of I1 (YES in Step S730), and the remaining time slice of the interrupt output destination partition 1 (130) is larger than zero (YES in Step S740). Therefore, the partition 1 (130) being the interrupt output destination is executed (S750), and TASK 12 being an interrupt handler for the interrupt I1 is executed.

Subsequently, it is assumed that, at the time t9, the timer interrupt occurs and the timer interrupt processing of the hypervisor (120) illustrated in FIG. 6 is executed. At this time, assuming that the remaining time slice (303) of the partition 1 (130) in execution is zero (NO in Step S600), the execution time corresponding to one scheduling period has not elapsed (NO in Step S630), and the scheduling processing of the hypervisor (120) illustrated in FIG. 7 is executed without another step. At this time, the partition 3 (150) with the highest execution priority (304) is selected from among the partitions that have the remaining time slice (303) larger than zero and have the status (306) of "ready for execution" (S700). Subsequently, I2 is a pending interrupt (YES in Step S710), and hence I2 is selected as the pending interrupt with the highest interrupt priority (403) (S720). The interrupt disable level (305) of "8" of the selected partition 3 (150) is lower than the interrupt priority (403) of "3" of I2 (YES in Step S730), and the remaining time slice of the interrupt output destination partition 2 (140) indicated by the interrupt output destination partition number (402) is larger than zero (YES in Step S740). Therefore, the partition 2 (140) being the interrupt output destination is executed (S750), and TASK 21 being the interrupt handler task of the interrupt I2 is executed.

Subsequently, it is assumed that, at the time t10, the timer interrupt occurs and the timer interrupt processing of the hypervisor (120) illustrated in FIG. 6 is executed. At this time, assuming that the remaining time slice (303) of the partition 2 (140) in execution is zero (NO in Step S600), the execution time corresponding to one scheduling period has not elapsed (NO in Step S630), and the scheduling processing of the hypervisor (120) illustrated in FIG. 7 is executed without another step. In this case, the partition 3 (150) having the remaining time slice (303) larger than zero and having the status (306) of the executable status is selected (S700), and no pending interrupt exists (NO in Step S710). Therefore, the selected partition 3 (150) is executed (S760), and TASK 32 is executed.

Finally, it is assumed that, at the time T2, that is, after another scheduling period has elapsed, the timer interrupt occurs and the timer interrupt processing of the hypervisor (120) illustrated in FIG. 6 is executed. At this time, the execution time corresponding to another scheduling period has elapsed (YES in Step S630), and hence the values of the remaining time slice (303) of all the partitions are reset to the values of the initial time slice (302) (S640). In the following scheduling processing illustrated in FIG. 7, the partition 1 (130) is selected (S700), and because no pending interrupt exists (NO in Step S710), the selected partition 1 (130) is executed (S760).

As described above, in the control system according to this embodiment, the interrupt disable level of the partition for executing a periodic task is set higher than the interrupt priority of a control target, and the interrupt disable level of another partition is set lower than the interrupt priority of the control target, to thereby be able to process the interrupt for the control target in preference to another task without hindering the execution of the periodic task with the highest priority.

Therefore, according to this embodiment, it is possible to provide a logical partitioning system for handling a priority interrupt without impairing the real-time property of the periodic task, which solves the above-mentioned problem, and a hypervisor having such a logical partitioning function.

The schedule period is a schedule period of the hypervisor, and does not necessarily match a schedule period of the OS within the partition. However, as in this embodiment, a period of the periodic task and the schedule period are set to match each other, or the schedule period is set to 1/N (N represents a natural number) of the period of the periodic task, to thereby be able to facilitate startup setting of the periodic task.

What is claimed is:

1. A partition execution control apparatus, comprising:
    a plurality of partitions;
    a storage module configured to store:
        a first table configured to store a task executable time and an interrupt disable level, which correspond to each of the plurality of partitions; and
        a second table configured to store an interrupt priority which corresponds to an external device coupled to each of the plurality of partitions in association with an interrupt processing execution partition; and
    a control module configured to:
        control the interrupt processing execution partition, which is stored in the second table, to be executed as long as the task executable time of the partition stored in the first table remains in a case where an interrupt is received from the external device with the interrupt priority exceeding the interrupt disable level;
        periodically reset the task executable time of each of the plurality of partitions to an initial value;
        decrement the task executable time stored in the first table, which corresponds to one of the plurality of partitions in execution, with a timer interrupt being used as a trigger; and
        store a decremented result into the first table corresponding to the one of the plurality of partitions in execution.

2. The partition execution control apparatus according to claim 1, wherein the control module is further configured to compare the interrupt disable level of one of the plurality of partitions having the task executable time remaining and the interrupt priority of a pending interrupt, to thereby select one of the plurality of partitions to be executed in a case where the task executable time of the one of the plurality of partitions in execution is exhausted.

3. The control apparatus according to claim 2, wherein the control module is further configured to set a period for resetting the task executable time to the initial value based on a total sum of task times of tasks which are executed by the plurality of partitions, respectively.

4. A partition execution control method including a plurality of partitions, the partition execution control method comprising:
    storing into a storage module:
        a first table configured to store a task executable time and an interrupt disable level, which correspond to each of the plurality of partitions; and
        a second table configured to store an interrupt priority which corresponds to an external device coupled to each of the plurality of partitions in association with an interrupt processing execution partition;
    controlling, by a control module, the interrupt processing execution partition, which is stored in the second table, to be executed as long as the task executable time of the partition stored in the first table remains in a case where an interrupt is received from the external device with the interrupt priority exceeding the interrupt disable level;
    periodically resetting, by the control module, the task executable time of each of the plurality of partitions to an initial value;
    decrementing the task executable time stored in the first table, which corresponds to one of the plurality of partitions in execution, with a timer interrupt being used as a trigger; and
    storing a decremented result into the first table corresponding to the one of the plurality of partitions in execution.

5. The partition execution control method according to claim 4, further comprising comparing the interrupt disable level of one of the plurality of partitions having the task executable time remaining and the interrupt priority of a pending interrupt, to thereby select one of the plurality of partitions to be executed in a case where the task executable time of the one of the plurality of partitions in execution is exhausted.

6. The partition execution control method according to claim 5, further comprising setting a period for resetting the task executable time to the initial value based on a total sum of task times of tasks which are executed by the plurality of partitions, respectively.

7. A non-transitory computer-readable storage medium having stored thereon a program for executing the partition execution control method of claim 4.

* * * * *